United States Patent
Eisermann

(10) Patent No.: US 6,568,148 B1
(45) Date of Patent: May 27, 2003

(54) COVERING ELEMENT FOR BUILDING SURFACES OR THE LIKE AND METHOD FOR THE PRODUCTION THEREOF

(75) Inventor: Ralf Eisermann, Cochem (DE)

(73) Assignee: Akzenta Paneele + Profile GmbH (DE)

( * ) Notice: Subject to any disclaimer, the term of this patent is extended or adjusted under 35 U.S.C. 154(b) by 0 days.

(21) Appl. No.: 09/485,430

(22) PCT Filed: Aug. 14, 1998

(86) PCT No.: PCT/DE98/02357

§ 371 (c)(1),
(2), (4) Date: Feb. 9, 2000

(87) PCT Pub. No.: WO99/09274

PCT Pub. Date: Feb. 25, 1999

(30) Foreign Application Priority Data

Aug. 14, 1997 (DE) .......................................... 197 35 189

(51) Int. Cl.[7] .............................................. E04C 2/54
(52) U.S. Cl. .................... 52/783.1; 52/794.1; 52/126.6; 52/311; 52/126.5; 428/203; 428/211; 428/531; 428/192; 428/201; 428/205; 428/76; 156/90; 156/219; 156/220; 156/277; 156/288; 156/311; 156/335
(58) Field of Search .................. 156/90, 219, 220–277, 156/288, 311, 335; 428/203, 211, 531, 192, 201, 205, 76; 52/794.1, 126.6, 311, 783.1, 126.5, 796.1

(56) References Cited

U.S. PATENT DOCUMENTS

| | | |
|---|---|---|
| 2,816,851 A | 12/1957 | Arledter et al. |
| 3,716,440 A | 2/1973 | Ando et al. |
| 4,006,048 A | 2/1977 | Cannady, Jr. et al. |
| RE30,233 E * | 3/1980 | Lane et al. .................. 428/207 |
| 4,409,280 A * | 10/1983 | Wiley et al. ................. 428/203 |
| 6,090,471 A * | 7/2000 | Abrams ....................... 428/195 |
| 6,165,593 A * | 12/2000 | Brault et al. ................. 428/195 |

FOREIGN PATENT DOCUMENTS

| | | | |
|---|---|---|---|
| DE | 1089966 | * | 9/1960 |
| DE | 25 29 676 A1 | | 1/1977 |
| DE | 4011656 C2 | * | 1/1995 |
| DE | 4324137 A1 | * | 1/1995 |
| GB | 86 18 554.3 | | 8/1986 |

* cited by examiner

Primary Examiner—Jose V. Chen
Assistant Examiner—Chi Q Nguyen
(74) Attorney, Agent, or Firm—Brooks & Kushman P.C.

(57) ABSTRACT

The present disclosure involves a covering element for building surfaces and a method for the production thereof. The covering element includes a decorative visible side generally having a support plate having top and bottom surfaces, an upper transparent face sheet bonded to the top surface of the support plate, and a lower face sheet bonded to the bottom surface of the support plate. The upper face sheet has a support layer having cellulose in which an abrasion-resistant material is embedded in the form of corundum particles. In the present configuration, a decorative layer is applied to the bottom of the support layer by a color printing process. The decorative layer, which is underneath the support layer, is visible after all the layers have been pressed together under the application of heat. This process causes it to become transparent. The support layer and the decorative layer are covered with bonding material having melamine resin. The lower face sheet includes a tension layer made of paper which is also covered with bonding material.

12 Claims, 3 Drawing Sheets

PRIOR ART

COVERING ELEMENT FOR BUILDING SURFACES OR THE LIKE AND METHOD FOR THE PRODUCTION THEREOF

BACKGROUND OF THE INVENTION

The invention relates to a method for the production of resistant covering elements for building surfaces or the like, especially for the production of decorative floor covering elements, consisting of several layers which are assembled in a sandwich-type construction by applying pressure and heat, with an upper transparent face sheet on the decorative side, which is also referred to as "overlay paper", a decorative layer, a support plate and a lower face sheet, where the upper face sheet is prefabricated from a support layer, in which an abrasion-resistant material is embedded and which is provided with a bonding material, and a covering element manufactured according to this method, consisting of a support plate, a transparent face sheet on the visible side, a decorative layer and a lower face sheet with a tension layer provided on the bottom side of the support plate facing the building surface.

In the previously known covering elements of the type described, four different layers are prefabricated and then bonded together in a sandwich-type construction by applying pressure and heat.

The support layer of the upper face sheet of known covering elements essentially consists of cellulose. The abrasion-resistant material is embedded in the cellulose layer in the form of corundum particles.

According to the known method, the decorative layer is applied to a special layer, which has to be prefabricated for the sole purpose of applying the decorative layer. This layer consists of at least three layers. The first layer is a special white decorative support layer made of paper or the like. The decorative layer, which preferably consists of ink, is applied to this layer by a printing process, for example. A bonding material is then applied to the connected layers—meaning the decorative support layer and the decorative layer—at least on their common top side, preferably on their top and bottom side. Melamine resin, or an agent containing melamine resin, is used as the bonding material, for example.

Thus, the layer containing the decorative layer was previously constructed from four layers in the following order: a top bonding material layer, the decorative layer, the decorative support layer and a bottom bonding material layer.

Manufacturers of covering elements usually produce the support plate themselves and purchase the overlay paper, the special layer with the decorative layer and the lower face sheet from suppliers. The suppliers manufacture the decorative layer in the desired designs.

A covering element can be used until the upper transparent face sheet wears off and is destroyed by the further use of the decorative layer. One disadvantage of the known covering element is that only the bonding material layer on top of the decorative layer contributes to increasing the abrasion-resistance of the covering element. The decorative support layer itself makes no contribution in this context.

Under the influence of pressure and temperature during manufacture, the decorative support layer located on the visible side of the support plate and the support layer of the upper transparent face sheet build up internal stresses acting in the same direction. These stresses cause the covering to deform, primarily in its longitudinal direction, where the line of deformation is perpendicular to the plane in which the covering element extends. The lower face sheet is applied to the bottom of the support plate in order to compensate for the deformation. This sheet has a tension layer. The tension layer also develops internal stresses and counteracts the deformation. The tension layer must develop internal stresses equal in magnitude to those of the layers located on the visible side of the support plate, so that the internal stresses can be counteracted and there is no deformation of the support plate and thus of the covering element.

The tension layer must be able to develop internal stresses equal in magnitude to those of the decorative support layer located on the visible side of the support plate and the support layer together. Assuming that the decorative support layer, the support layer and the tension layer all have roughly the same material quality, the tension layer must be equally as thick as the sum of the thickness of the decorative support layer and the support layer. Therefore, the tension layer requires a lot of material and increases the weight. These factors increase the manufacturing, storage and transport costs of the covering element.

SUMMARY OF THE INVENTION

The object of the invention is to design a covering element, and a method of producing it, with which thin, lightweight covering elements can be manufactured simply and the cost of material, manufacturing, storage and transport reduced.

According to the invention, the object is solved in that the decorative layer is applied to the support plate, or in the area of the bottom of the face sheet, and is processed together with the support plate or the face sheet to form a prefabricated layer. In the covering element manufactured according to this method, only the decorative layer and a bonding material layer are located between the support layer of the upper face sheet and the support plate. The thickness of the tension layer of the lower face sheet is essentially equal to the thickness of the support layer.

This simple measure reduces the number of layers to be prefabricated to a maximum of three. The special layer for the decorative layer is eliminated. Instead, it is combined with the upper transparent face sheet to form a single layer. Alternatively, it can also be combined with the support plate to form a single layer. In the latter case, the decorative layer is applied to the top side of the support plate facing the upper face sheet.

Decreasing the number of layers to be prefabricated reduces the number of required manufacturing steps and cuts the manufacturing costs.

The overall thickness of the covering element can be thinner and the covering element can be lighter than before, thus reducing the material, storage and transport costs.

On the visible side of the covering element, the support plate now has only one layer which generates internal stresses, namely the support layer of the upper face sheet. Thus, the tension layer of the lower face sheet can advantageously be thinner than before, meaning essentially as thick as the support layer of the upper face sheet.

If the overall thickness of the known covering element can be retained, the covering element manufactured according to the new method offers another advantage: the support layer of the upper face sheet can then be designed with a thickness equal to the previous thickness of the support layer and the decorative support layer together. This advantageously results in a layer of abrasion-resistant material that is twice as thick and which lasts twice as long as the known covering element under the same degree of wear and tear. In this context, the thickness of the tension layer of the lower face sheet is equal to the thickness of the doubled support layer.

Of course, surfaces other than building surfaces, such as furniture surfaces, can be advantageously manufactured according to this method. It is particularly suitable for, among other things, kitchen counters, which need to have an especially durable surface.

The decorative layer is expediently manufactured by coating with ink. It is particularly favourable if the decorative layer is applied to the bottom of the support layer of the face sheet. Alternatively, a bonding material layer can first be applied to the bottom of the support layer of the face sheet, followed by the decorative layer. The face sheet prefabricated in this way can then be prefabricated by the manufacturers of overlay papers and purchased and further processed by the manufacturers of the covering elements.

For reasons relating to the technical manufacturing process, it can be advantageous to apply the decorative layer to the top of the support plate. It then comes into contact with the bonding material at a later time.

The ink for the decorative layer is preferably applied according to the known printing process.

An example of the present invention is described below based on the drawings. The drawings show the following:

DETAILED DESCRIPTION OF THE PREFERRED EMBODIMENT(S)

All the figures are schematic diagrams of cross-sections of the individual layers. The layers are indicated by different hatch marks.

Figure 1:
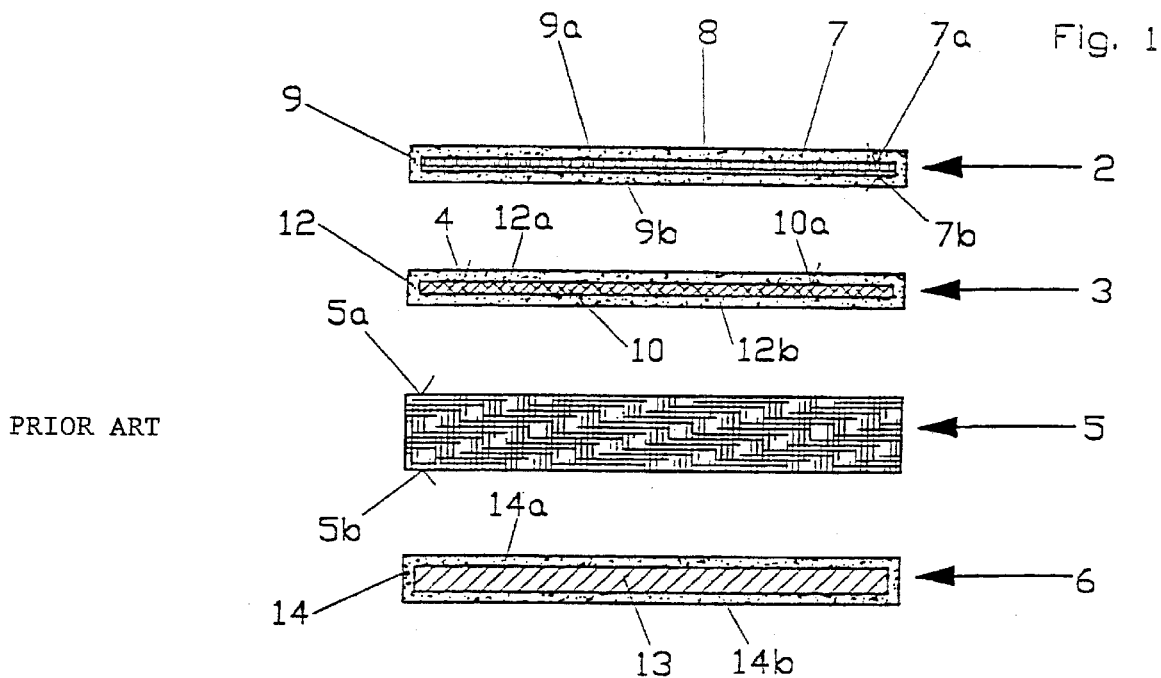
FIG. 1 (Prior art) The prefabricated layers of a covering element manufactured according to the known method, FIG. 2 The prefabricated layers of a covering element with a small overall thickness, manufactured according to the new method, FIG. 3 A known covering element, FIG. 4 A covering element with a small overall thickness, manufactured according to the new method, FIG. 5 A covering element with a support layer of twice the thickness, manufactured according to the new method, FIG. 6 The prefabricated layers of a configuration of a covering element manufactured according to the new method, FIG. 7 The prefabricated layers of another configuration of a covering element manufactured according to the new method.
Figure 3:
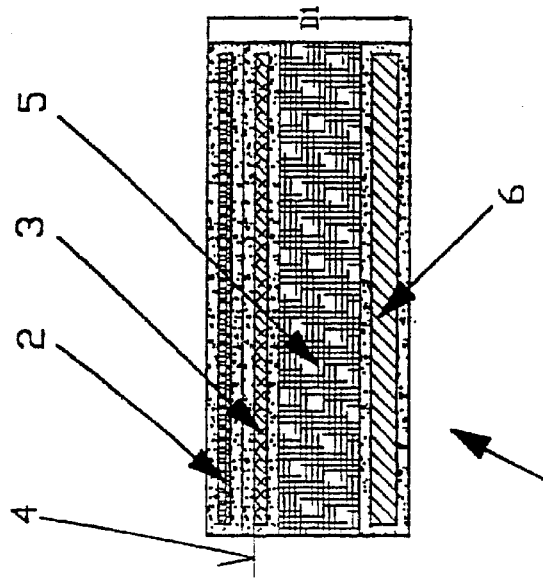

FIG. 1 shows the four layers which make up a covering element 1 manufactured according to the known method. The layers include an upper transparent face sheet 2, a special layer 3 with a decorative layer 4, a support plate 5 and a lower face sheet 6. Due to its small thickness, decorative layer 4 is only indicated by the reference number 4 in the figures and is not represented by specific hatch markings like the other layers. FIG. 1 shows the four layers in the above order, one on top of the other. The layers are assembled in this order in a press under the application of heat. Covering element 1 made of these layers is shown in FIG. 3.

According to FIG. 1, prefabricated upper face sheet 2 has a support layer 7 consisting essentially of cellulose, which becomes transparent after being bonded to the other layers by the application of pressure and heat. An abrasion-resistant material 8 is embedded in the cellulose in the form of corundum particles. Support layer 7 with abrasion-resistant material 8 is covered all over by a bonding material 9. In this configuration, bonding material 9 consists of melamine resin and forms the two melamine resin layers 9a and 9b, where open surface 9a of the melamine resin layer forms the surface of covering element 1 which can be walked on as a floor covering. This surface gradually wears off as a result of abrasion.

Special layer 3 consists of a special decorative support layer 10 made of white paper. Decorative layer 4, which consists of ink, is applied to top 10a of decorative support layer 10 by a colour printing process. After this processing step, layer 3 was covered all over with bonding material 12. Melamine resin was again used as bonding material 12, forming the two melamine resin layers 12a and 12b.

In this case, support plate 5 is made of HDF board (high-density fibreboard). It can alternatively be made of MDF board (medium-density fibreboard), particle board, wood core plywood, plywood, etc.

Lower face sheet 6 essentially consists of a tension layer 13 made of paper. This layer is also covered all over with bonding material 14. In this case, bonding material 14 consists of melamine resin and forms melamine resin layers 14a and 14b. In FIG. 1, the thickness of tension layer 13 is equal to the sum of the thicknesses of support layer 7 and decorative support layer 10, so that the covering element does not deform as a result of the internal stresses in layers 7, 10 and 13.

One disadvantage is that decorative support layer 10 does not make any contribution to increasing the abrasion resistance of covering element 1, since it is located under decorative layer 4.

Tension layer 13 is thicker than support layer 7. The additional thickness is equal to the thickness of decorative support layer 10. Decorative support layer 10 increase the overall thickness of covering element 1. Tension layer 13, which is relatively thick due to decorative support layer 10, further increases the overall thickness of covering element 1. The known covering element consequently requires a lot of material and its weight is increased.

Figure 2:
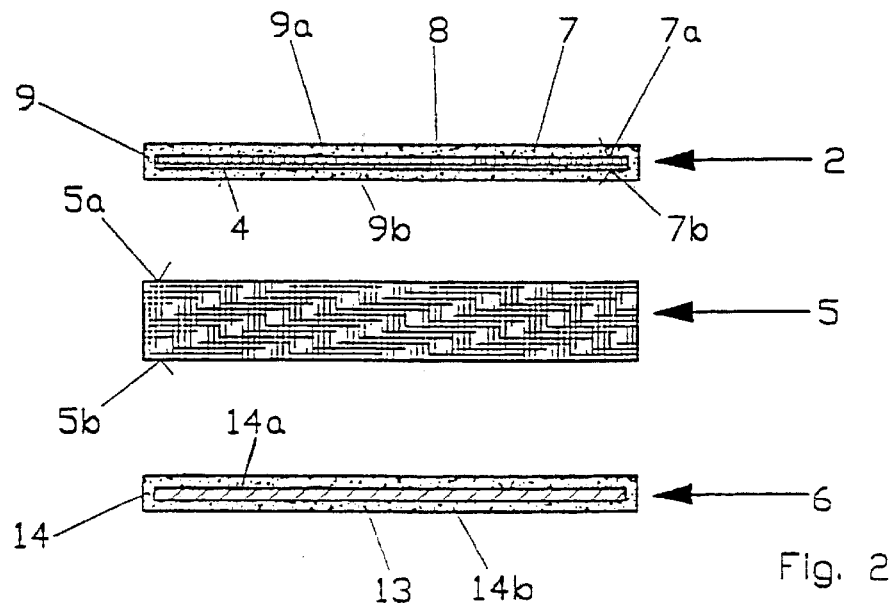
Figure 4:
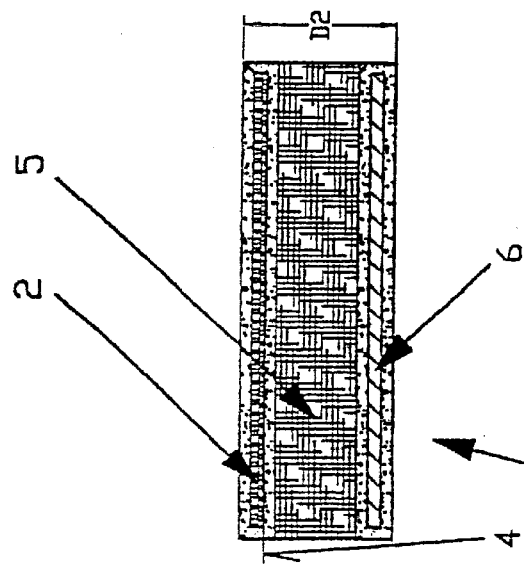

FIG. 2 shows the prefabricated layers of a covering element 1 manufactured according to the new method. Covering element 1 made up of these layers is shown in FIG. 4. The thickness of upper face sheet 2 and, in particular, of support layer 7 located therein, is equal to the thicknesses shown in FIG. 1 for upper face sheet 2 and support layer 7. As shown in FIG. 4, overall thickness D2 of finished covering element 1 is, however, much smaller than that of covering element 1 manufactured according to the known method shown in FIG. 3. This results from the fact that special layer 3 has been eliminated and tension layer 13 is only half as thick compared to the configuration in FIG. 3.

Prefabricated upper face sheet 2 according to FIG. 2 also has a support layer 7 consisting essentially of cellulose, in which an abrasion-resistant material 8 is embedded in the form of corundum particles. Special layer 3 with special decorative support layer 10 is eliminated. In the present configuration, decorative layer 4 was applied to bottom 7b of support layer 7 by a colour printing process. Decorative layer 4, which is underneath support layer 7, is visible after all the layers have been pressed together under the application of heat. This process causes it to become transparent.

After printing, support layer 7, with decorative layer 4 printed on it, was covered all over with bonding material 9 consisting of melamine resin, which forms the two melamine resin layers 9a and 9b. Advantageously, the thickness of tension layer 13 of lower face sheet 6 is now only as large as the thickness of support layer 7 of upper face sheet 2.

FIG. 3 shows a finished covering element according to the prior art. It has a relatively large overall thickness D1. The subsequent FIGS. 4 and 5 illustrate the advantages of the covering element manufactured according to the new method.

The configuration of the covering element illustrated in FIG. 4 shows a covering element manufactured according to the new method that has a smaller overall thickness D2 than the known covering element according to FIG. 3, because special decorative support layer 10 has been eliminated. It is lighter and can be manufactured with less material.

Figure 5:
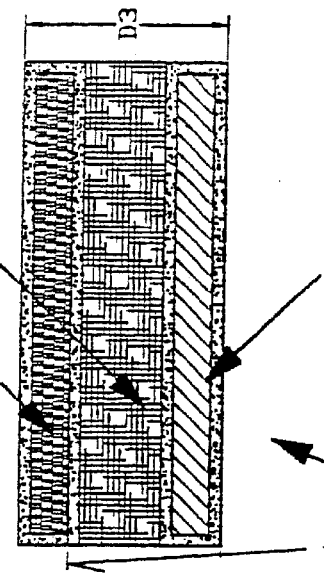

An alternative configuration is shown in FIG. 5. In this case, overall thickness D3 is equal to overall thickness D1 in FIG. 3. With the same thickness of support plate 5 and the same overall thickness (D1=D3) of the two covering elements, support layer 7 shown in FIG. 5 is more than twice as thick as support layer 7 of the known covering element in FIG. 3. The advantage of the configuration according to FIG. 5 is that there is more than twice as much abrasion-resistant material 8 on top of decorative layer 4, and that covering element 1 lasts roughly twice as long as the covering element according to FIG. 3, due to the fact that support layer 7 is more than twice as thick.

Figure 6:
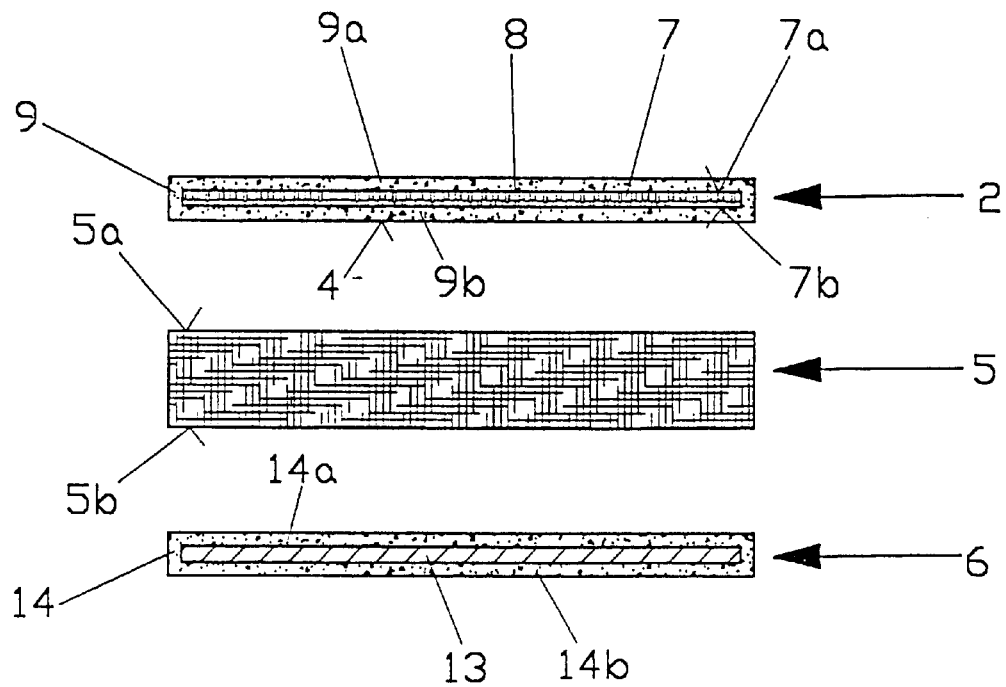

FIG. 6 shows a configuration of the covering element according to the invention, in which decorative layer 4 is not applied directly to the bottom of support layer 7 of upper face sheet 2. In this practical example, bonding material 9 made of melamine resin is applied to support layer 7 first, thus forming melamine resin layers 9a and 9b. Decorative layer 4 is printed on the bottom melamine resin layer 9b.

Figure 7:
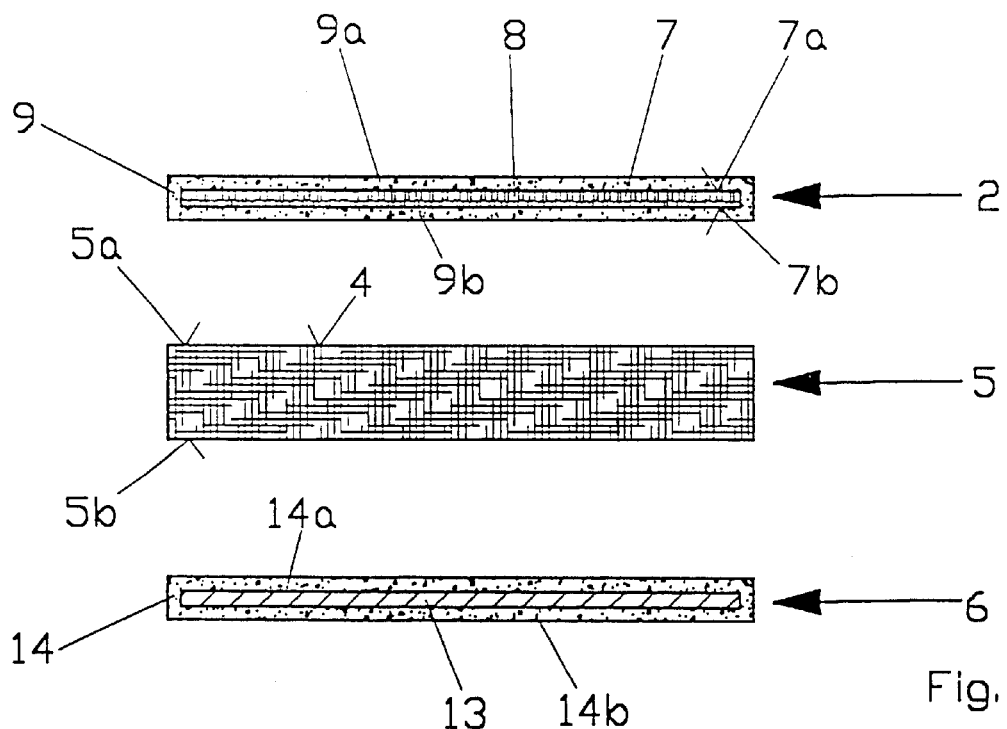

Another configuration of the covering element according to the invention is shown in FIG. 7. In this method, decorative layer 4 is printed on the top 5a of support plate 5.

The overall thicknesses of the covering elements according to the configurations shown in FIGS. 6 and 7 are much smaller than the overall thickness of the known covering element according to FIG. 3.

Covering element for building surfaces or the like and method for the production thereof

LIST OF REFERENCE NUMBERS

1 Covering element
2 Upper transparent face sheet
3 Special layer
4 Decorative layer
5 Support plate
5a Top (support plate)
5b Bottom (support plate)
6 Lower face sheet
7 Support layer
7a Top (support layer)
7b Bottom (support layer)
8 Abrasion-resistant material
9 Bonding material
9a Melamine resin layer
9b Melamine resin layer
10 Decorative support layer
10a Top (decorative support layer)
12 Bonding material
12a Melamine resin layer
12b Melamine resin layer
13 Tension layer
14 Bonding material layer
14a Melamine resin layer
14b Melamine resin layer
D1 Overall thickness
D2 Overall thickness
D3 overall thickness

What is claimed is:

1. Method for a production of resistant covering elements for building surfaces, especially for the production of decorative floor covering elements, consisting of several layers which are assembled in a sandwich-type construction by applying pressure and heat, with an upper transparent face sheet on a decorative side, the upper transparent face sheet having a bottom surface, a decorative layer, a support plate and a lower face sheet, where the upper face sheet is prefabricated from a support layer having a bottom surface, in which an abrasion-resistant material is embedded and which is provided with a bonding material, characterized in that the decorative layer is applied to one of the bottom surface of the upper face sheet or the bottom surface of the support layer, and is processed together with the support plate or the upper face sheet to form a prefabricated layer.

2. Method as per claim 1, characterized in that the decorative layer is manufactured by coating with ink.

3. Method as per claim 1 or 2, characterized in that the decorative layer is applied to the bottom of the support layer of the face sheet.

4. Method as per claim 1 or 2, characterized in that a bonding material layer is applied to the bottom of the support layer of the face sheet, followed by the decorative layer.

5. Method as of claim 2, characterized in that the ink for the decorative layer is applied by a printing process.

6. Covering element for a production of resistant building surfaces, especially for the production of floor coverings with a decorative visible side at least comprising of a support plate, an upper transparent face sheet having a bottom surface, provided on the visible side and consisting of a support layer with an abrasion-resistant material embedded in it, the support layer having a bottom surface and a visible side, and a bonding material layer covering at least the visible side of the support layer, a decorative layer, which is visible through the upper face sheet, and a lower face sheet with a tension layer provided on the bottom of the support plate facing the building surface, characterized in that the decorative layer is applied to one of the bottom surface of the support layer of the upper transparent face sheet or the bottom of the upper face sheet.

7. Covering element as per claim 6, characterized in that the decorative layer consists of ink.

8. Covering element as per claim 6 or 7, characterized in that the decorative layer is located on the top of the support plate.

9. Covering element as of claim 7, characterized in that the ink for the decorative layer is applied by a printing process.

10. A surface covering comprising:

an upper transparent face sheet having a bottom surface and consisting of a support layer having a bottom surface, the support layer having an abrasion-resistant material embedded therein and a bonding material layer covering the visible side of the support layer;

a decorative layer attached to one of the bottom surface of the support layer or the bottom surface of the upper transparent face sheet;

a support plate; and a lower face sheet.

11. The surface covering of claim 10 wherein the decorative layer comprises ink.

12. A method of making a surface covering comprising:

providing an upper transparent face sheet having a bottom surface and consisting of a support layer having a bottom surface, the support layer having an abrasion-resistant material embedded therein and a bonding material layer covering the visible side of the support layer;

wherein a decorative layer is attached to one of the bottom surface of the support layer or the bottom surface of the upper transparent face sheet;

providing a support plate;

providing a lower face sheet; and applying heat and pressure to the upper transparent face sheet, the support plate, and the lower face sheet to create a multi-layered floor covering.

* * * * *